(12) United States Patent
Huang

(10) Patent No.: US 6,490,102 B1
(45) Date of Patent: Dec. 3, 2002

(54) HYBRID LENS SYSTEM

(76) Inventor: Yeo-Chih Huang, No. 4, 16th Rd., Taichung Industrial Zone, Taichung (TW)

( * ) Notice: Subject to any disclaimer, the term of this patent is extended or adjusted under 35 U.S.C. 154(b) by 0 days.

(21) Appl. No.: 09/570,234

(22) Filed: May 12, 2000

(51) Int. Cl.[7] ............................ G02B 9/14; G02B 13/18; G02B 17/00

(52) U.S. Cl. ...................... 359/785; 359/716; 359/726; 359/645; 359/651; 359/661; 359/742

(58) Field of Search ................................. 359/716, 726, 359/742, 785, 645, 651, 661

(56) References Cited

U.S. PATENT DOCUMENTS

| | | | | |
|---|---|---|---|---|
| 6,101,035 A | * | 8/2000 | Maruyama | 359/565 |
| 6,147,816 A | * | 11/2000 | Ori | 359/794 |
| 6,259,570 B1 | * | 7/2001 | Noda | 359/785 |
| 6,362,925 B1 | * | 3/2002 | Nakamura et al. | 359/684 |

FOREIGN PATENT DOCUMENTS

JP  2000-89107 A  *  3/2000

* cited by examiner

*Primary Examiner*—Evelyn A Lester
(74) *Attorney, Agent, or Firm*—Charles E. Baxley

(57) ABSTRACT

A lens system is particularly designed for use in an image reading device, essentially including three lenses elements, wherein two or three of them are plastic lenses.

15 Claims, 6 Drawing Sheets

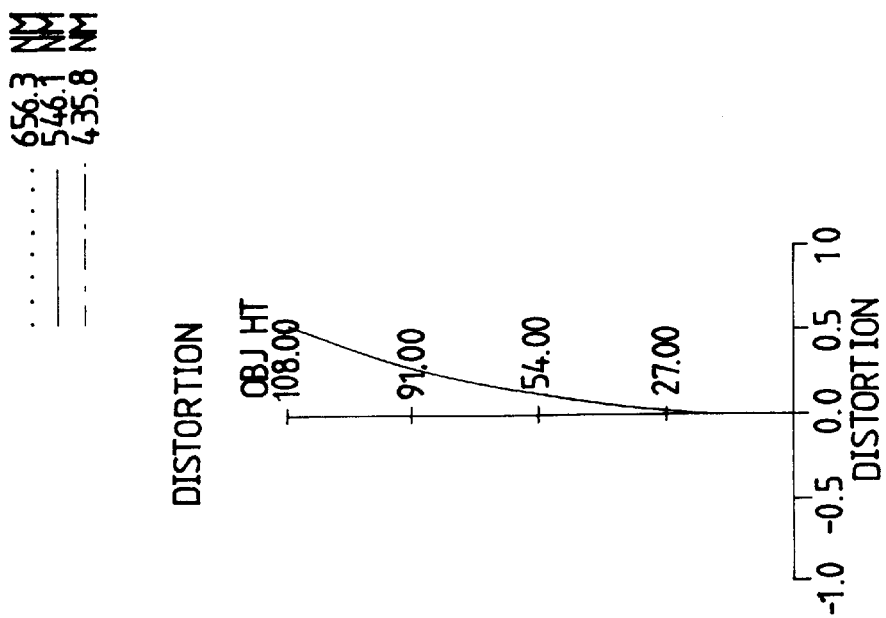
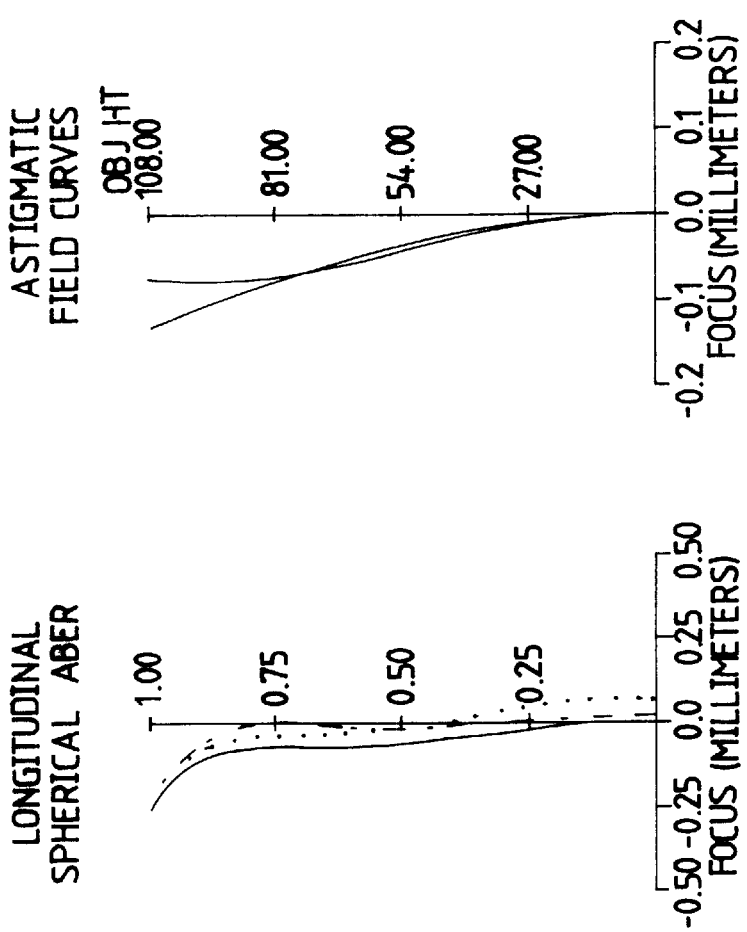
FIG. 4
FIG. 3
FIG. 2

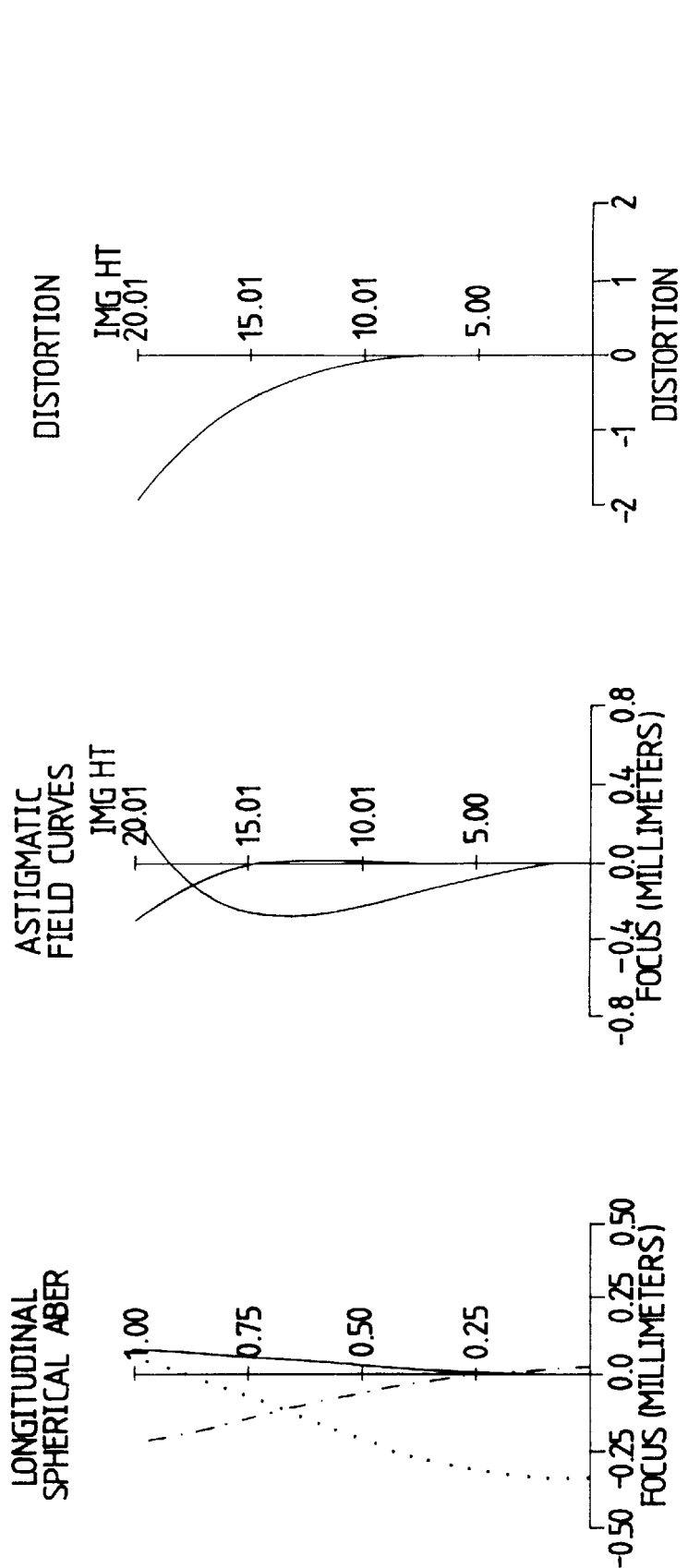

HYBRID LENS SYSTEM

BACKGROUND OF THE INVENTION

1. Field of the Invention

The present invention relates to a triplet lens system constructed with glass and plastic lenses. Although not limited thereto, it is particularly suitable to lens systems for being used with an image reading device.

2. Description of the Related Art

An image reading device generally consists of a glass lens system, but the glass lens system has its disadvantage of high manufacturing cost that refrains from number of elements of glass lenses. In lower cost without losing resolution, spherical glass lenses with three elements are widely used. Whereas aberration still exists and cannot be completely removed by only using three-element-spherical-glass lenses due to its limited controllable factors. Moreover, the field angle to an optical system may get larger as the whole system becomes smaller. As the field angle gets larger, it is more difficult to get rid of the aberration. In addition, high resolution is maintained by reducing the aperture size though incurring insufficient lightness of the lens system and lower diffractive limit from smaller size of the aperture. Therefore, the manufacturing cost, the field angle, the resolution, the illumination, and the diffractive limit become trade-off variables in the optical design.

The use of the plastic lenses may be considered as a solution to the above-mentioned problems.

First of all, the plastic lens made by injection molding of an injection machine is considered to decrease the cost, easier to be produced into aspheric surface or diffractive surface. Unlike the spherical surface, the aspheric and diffractive surfaces have more controllable factors than the spherical surface to eliminate the image aberration and chromatic aberration so as to improve the resolution and to uplift the field angle. Moreover, the aperture can be larger so as to resolve the illumination and diffractive limit problems.

Second, the use of plastic lens can create new lens layout that differ with common triplet lens system. Usually, a lens system with three elements is suggested positioning with positive-negative-positive allocation, or called Cook Triplet System. In such lens system, position of lenses has the following three types: the first lens with forwarded convex surface, positive meniscus or bi-convex lens; the second lens with bi-concave surface; the third lens with bi-convex surface.

During the manufacturing of the glass lens, it is not easy to control the centering error. Considering the cost of production, in design of the lens, the curvature of the two sides of the lens cannot be too close. The plastic lens is made of injection so that it is easy to control the centering error of the meniscus lens. At the same time, during development of the plastic mold, the meniscus lens can reach a precision better than that of glass lens, thereby enhancing the resolution. Therefore, the meniscus positive or negative lens can be adapted to co-operate with an aspherical or diffractive surface so as to obtain a greater field angle.

SUMMARY OF THE INVENTION

In accordance with one aspect of the present invention, the main objective of this invention is to completely resolve aberration by means of applying more than two plastic lenses in a three-element lens system.

In order to achieve the primary objective, the lens system according to a first embodiment of the present invention uses a positive-negative-positive arrangement. The first lens uses a positive meniscus plastic lens instead of the positive meniscus glass lens in the prior art. The second lens uses a forward concave surface and negative meniscus plastic lens instead of the bi-concave glass lens in the prior art. The third lens uses a forward concave surface and positive meniscus glass lens instead of the bi-convex glass lens in the prior art. At least one aspheric surface is mounted on one of the plastic lenses, and a diffractive surface is mounted on the first lens. The focal length of the lens system and the plastic lenses satisfy the following equation:

$$0.2 < |f_2/f_1| < 0.7 \quad [1]$$

$$0.2 < |f_2/f_s| < 0.6 \quad [2]$$

wherein, $f_1$ is the focal length of the first lens, $f_2$ is the focal length of the second lens, and $f_s$ is the focal length of the optical lens system.

The reasons for applying the plastic-plastic-glass arrangement are explained as follows.

In the so-called "Cook Triplet System", the focus of the third lens is desired to be shorter than that of the first lens. In other words, it is desirable that the refractive rate of the third lens is higher than that of the first lens for facilitating the design. In addition, it is easier to find a glass material with a high refractive index so that the plastic material is to be applied in the first lens.

The first lens is made of plastic material in that the plastic material is easier to be made into an aspheric or a diffractive surface so that it has a greater ability to resolve the aberration. Relatively, in addition to be provided with a bi-concave shape, the second lens may also be designed to have a meniscus shape so as to increase the precision of the plastic lens, thereby enhancing the image quality. Equation [1] and equation [2] are thus derived for resolving the aberration problem. It is desired that the first lens has a higher Abbe-number so that the diffractive surface was designed to be mounted in the first lens for improving the chromatic aberration.

The lens system according to a second embodiment of the present invention is the opposite case of the first embodiment. Because the allocation of the lenses was reversed, the relationship between the focal length of the second and the third lenses, and the relationship between the focal length of the second lens and the whole optical system are changed and should to satisfy the following condition.

$$0.4 < |f_2/f_3| < 0.8 \quad [3]$$

$$0.2 < |f_2/f_s| < 0.6 \quad [4]$$

wherein, $f_2$ is the focal length of the second lens, $f_3$ is the focal length of the third lens, and $f_s$ is the focal length of the whole optical system.

The lens system according to a third embodiment of the present invention uses a positive-negative-positive arrangement, and all of the lenses are made of plastic. A diffractive surface is allocated in the second lens, and the aspheric surfaces are allocated in the plastic lenses. The focal length of the second lens and the whole lens system should to satisfy the following equation:

$$|f_2/f_s| < 0.6 \quad [5]$$

wherein, $f_2$ is the focal length of the second lens, $f_s$ the focal length of the whole optical system.

In the equation [5], the aberration problem can be easily rectified. Because the kinds of the optical plastic material are limited, the diffractive surface is used to reinforce the capability of chromatic aberration reduction.

Further benefits and advantages of the present invention will become apparent after a careful reading of the detailed description with appropriate reference to the accompanying drawings.

BRIEF DESCRIPTION OF THE DRAWINGS

FIG. 2 shows a spherical aberration curve of the first embodiment as shown in FIG. 1;

FIG. 3 shows a astigmatism curve of the first embodiment as shown in FIG. 1;

FIG. 4 shows a distortion curve of the first embodiment as shown in in FIG. 1;

FIG. 10 shows a spherical aberration curve of the third embodiment as shown in FIG. 9;

FIG. 11 shows a astigmatism curve of the third embodiment as shown in FIG. 9; and FIG. 12 shows a distortion curve of the third embodiment as shown in FIG. 9.

DETAILED DESCRIPTION OF THE INVENTION

Figure 1:
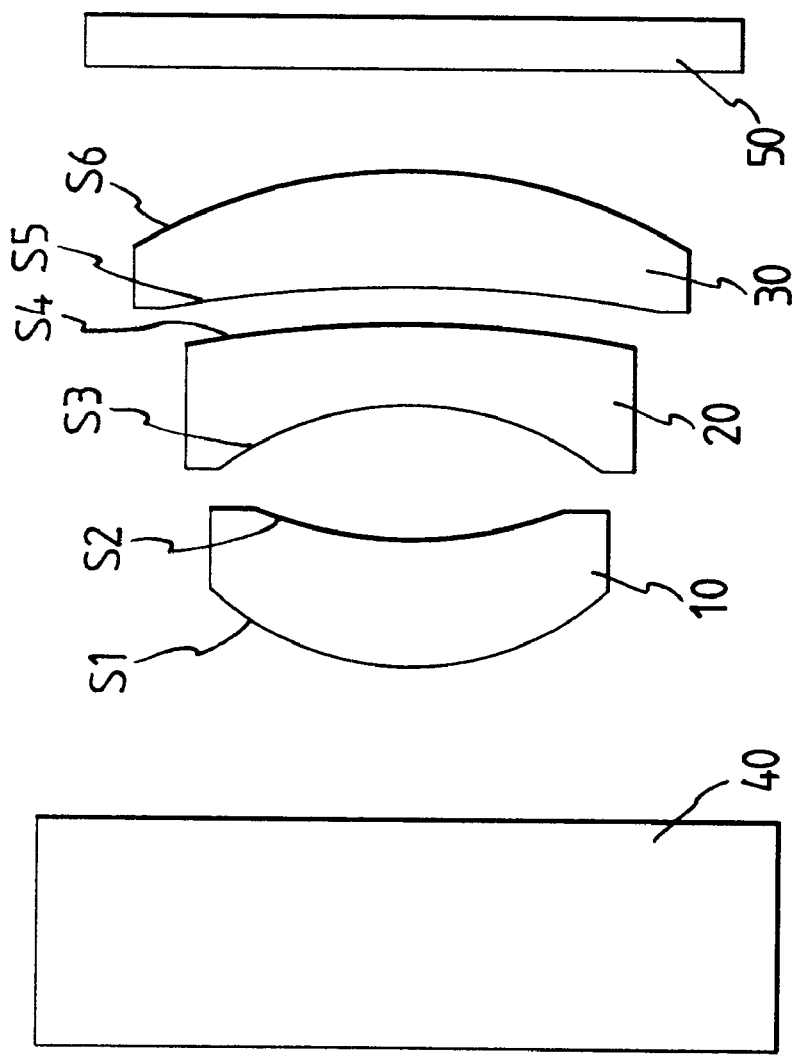
FIG. 1 is a front plan view of a lens system in accordance with a first embodiment of the present invention.
Figure 5:
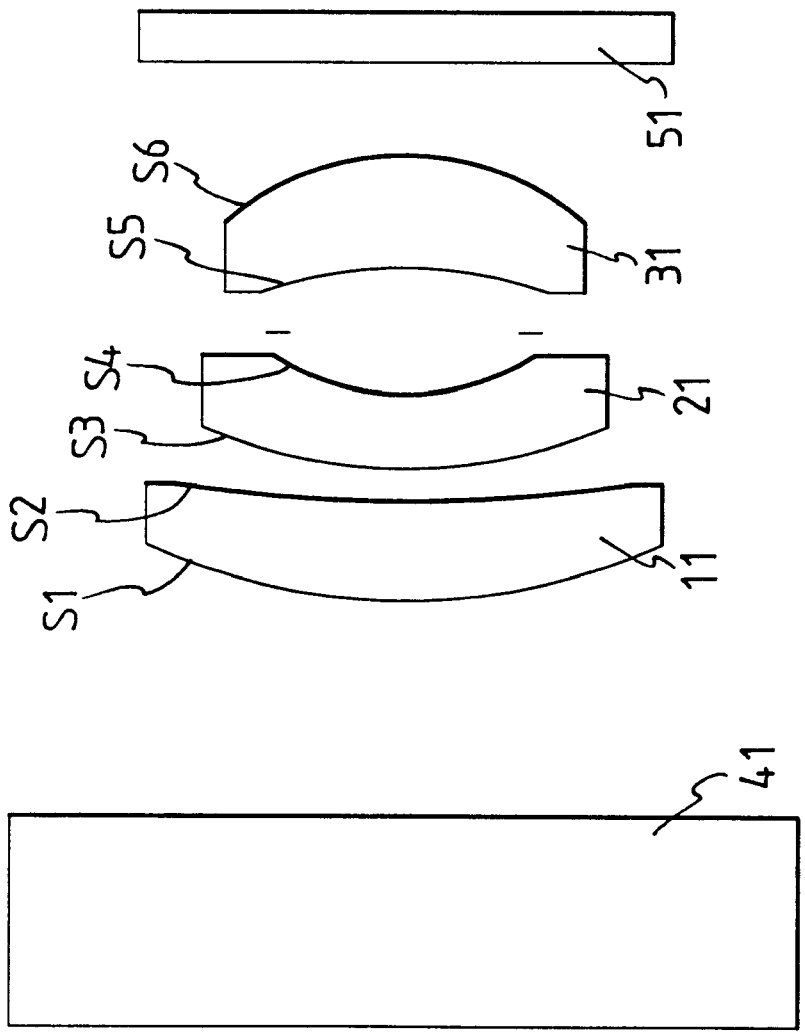
FIG. 5 is a front plan view of a lens system in accordance with a second embodiment of the present invention.

Referring to the drawings and initially to FIGS. 1–4, in accordance with a first embodiment of the present invention, the optical lens system 100 comprises three juxtaposed lenses 10, 20 and 30. The first lens 10 is a positive lens made of plastic having a front side formed with a convex surface S1 and a rear side formed with a concave surface S2. The second lens 20 is a negative lens made of plastic having a front side formed with a concave surface S3 and a rear side formed with a convex surface S4. The third lens 30 is a positive lens made of glass having a front side formed with a concave surface S5 and a rear side formed with a convex surface S6. Aspheric surfaces were built on the lenses 10 and 20, and a diffractive surface is mounted on lens 10. This optical system includes two plate glasses 40 and 50 respectively located at its front and rear sides, which both are ineffective to the focal length of the lens system.

The equation for aspheric surface is expressed as below:

$$X(Y)=(Y^2/R)/(1+\text{sqrt}(1-(1+K)\times(Y/R)^2))+A_4\times Y^4+A_6\times Y^6+\ldots \quad [6]$$

Wherein,

X(Y) is the distance along the optical axis at the height from the optical axis Y.

Y is the height from the optical axis.

K is the conic coefficient.

$A_4, A_6, \ldots$, are the aspheric coefficients of $4^{th}, 6^{th}, \ldots$ order.

The equation for a phase difference of the diffractive surface is expressed as below:

$$Ph(Y)=2\times\pi/(WL)\times(C_1\times Y^2+C_2\times Y^4+\ldots) \quad [7]$$

Where,

Ph(Y) is the phase difference.

WL is the reference wavelength.

Y is the height from the optical axis.

$C_1, C_2, \ldots$ is the aspheric phase coefficient of $2^{nd}, 4^{th}, \ldots$ order.

Table 1 shows a demonstrated example of the first embodiment.

TABLE 1

The first demonstrated example of Embodiment I.

| Surface | Radius | Thickness | Index | V number | Notes |
|---|---|---|---|---|---|
| OBJ | Infinity | 0.000 | | | |
| | Infinity | 3.000 | 1.517 | 64.2 | Platen Glass |
| | Infinity | 316.489 | | | |
| S1 | 4.650 | 1.616 | 1.492 | 57.4 | Aspheric |
| S2 | 7.361 | 0.665 | | | Diffractive/Aspheric |
| STO | Infinity | 0.996 | | | |
| S4 | −4.512 | 1.000 | 1.585 | 29.9 | Aspheric |
| S5 | −16.038 | 0.521 | | | |
| S6 | −16.689 | 1.502 | 1.773 | 49.6 | |
| S7 | −6.853 | 26.224 | | | |
| | Infinity | 0.700 | 1.517 | 64.2 | Sensor cover glass |
| | Infinity | 1.300 | | | |
| IMG | | −0.025 | | | |

Notes
1. System focal length, fs = 27.70 mm, NA = 0.0714, HFOV = 18.62 degree
G1 focal length, f1 = 21.41 mm
G2 focal length, f2 = −11.00 mm
|f2/f1| = 0.514; |f2/fs| = 0.397
2. Coefficients for the aspheric surface S1:
K = 1.5538
3. Coefficients for the diffractive/aspheric surface S2:
C1 = 7.5401B-5, C2 = −4.3112E-5
K = 8.3749
4. Coefficients for the aspheric surface S3:
A4 = −1.0641E-3, A6 = −1.1197E-4

Referring to FIG. 2, it shows the spherical aberration curve of the first embodiment.

Referring to FIG. 3, it shows the astigmatism curve of the first embodiment.

Referring to FIG. 4, it shows the distortion curve of the first embodiment.

Referring to FIGS. 5–8, in accordance with a second embodiment of the present invention, the optical lens system 101 comprises three juxtaposed lenses 11, 21 and 31. The first lens 11 is a positive lens made of glass. The second lens 21 is a negative lens made of plastic having a front side formed with a convex surface S3 and rear side formed with a concave surface S4. The third lens 31 is a positive lens made of plastic having a rear side formed with a convex surface S6. Aspheric surfaces are built on the lenses 21 and 31, and a diffractive surface is mounted on the lens 31. This optical system includes two plate glasses 41 and 51 respectively located at its front and rear sides, which both are ineffective to the focal length of the lens system.

The equation for aspheric surface is expressed as equation [6], and the equation of phase difference of diffractive surface is expressed as equation [7].

TABLE 2

The first demonstrated example of Embodiment II.

| Surface | Radius | Thickness | Index | V number | Notes |
|---|---|---|---|---|---|
| OBJ | Plano | 0.000 | | | |
| | Plano | 3.000 | 1.517 | 64.2 | Platen Glass |
| | Plano | 316.985 | | | |
| S1 | 8.725 | 1.424 | 1.773 | 49.6 | |
| S2 | 22.661 | 0.477 | | | |
| S3 | 6.722 | 1.000 | | | Aspheric |
| S4 | 3.405 | 0.895 | 1.585 | 29.9 | Aspheric |
| STO | Plano | 0.900 | | | |
| S5 | −6.876 | 1.603 | 1.492 | 57.4 | Diffractive/Aspheric |
| S6 | −4.437 | 25.733 | | | Aspheric |
| | Plano | 0.700 | 1.517 | 64.2 | Sensor cover glass |
| | Plano | 1.300 | | | |
| IMG | | −0.012 | | | |

Notes
1. System focal length, fs = 27.85 mm, NA = 0.0714, HFOV = 18.51 degree
G2 focal length, f2 = −13.18 mm
G3 focal length, f3 = 20.46 mm
|f2/f3| = 0.644; |f2/fs| = 0.473
2. Coefficients for the aspheric surface S3:
A4 = −1.7802E-3, A6 = 6.3932E-5
3. Coefficients for the aspheric surface S4:
A4 = −4.0522E-3, A6 = −7.6849E-5
4. Coefficients for the diffractive/aspheric surface S5:
C1 = −4.5259E-4, C2 = 2.7731E-5, C3 = −7.6811E-6
A4 = −1.6987E-3, A6 = −1.3393E-4
5. Coefficients for the aspheric surface S6:
K = 1.359

Figures 6, 7, 8:
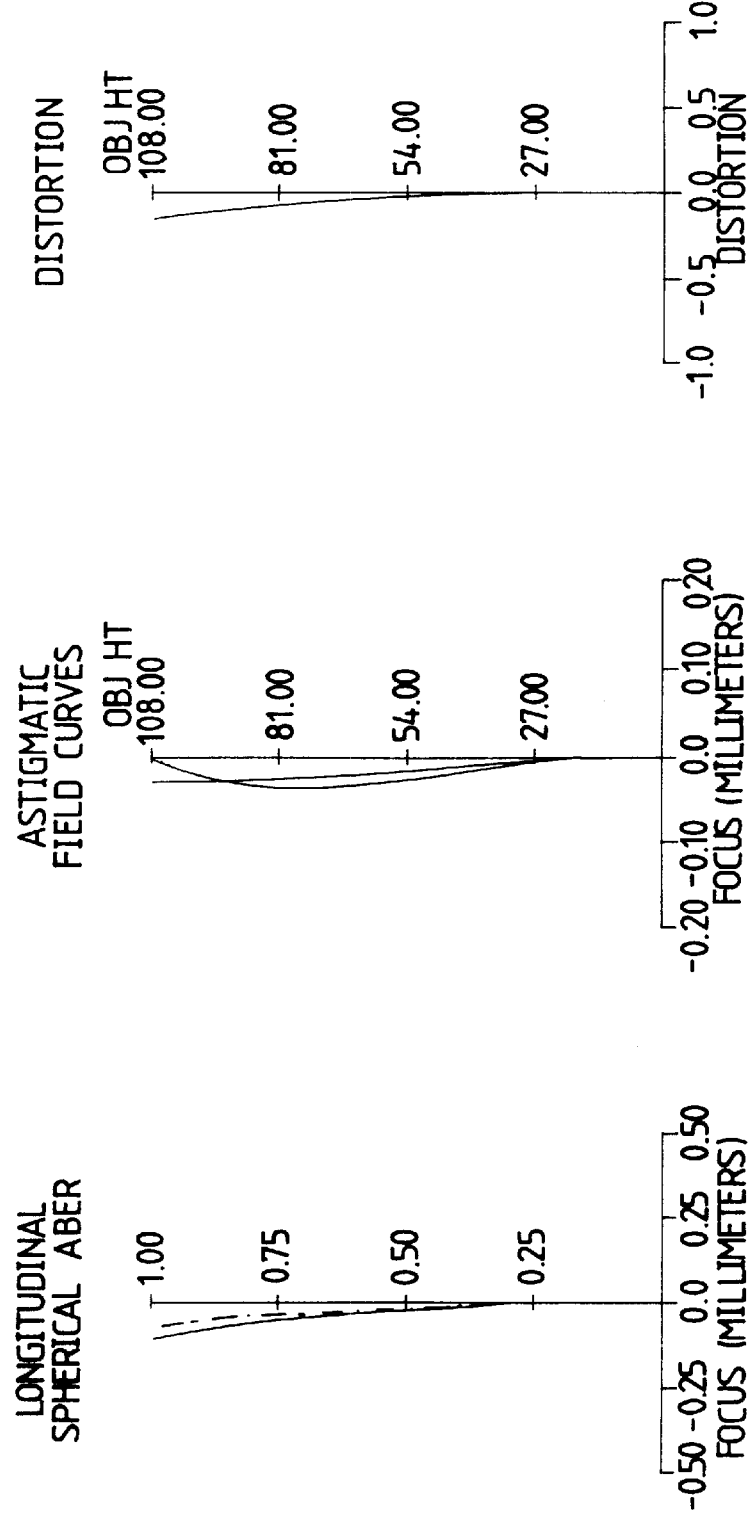
FIG. 6 shows a spherical aberration curve of the second embodiment as shown in FIG. 5.
FIG. 7 shows a astigmatism curve of the second embodiment as shown in FIG. 5.
FIG. 8 shows a distortion curve of the second embodiment as shown in FIG. 5.
Figure 9:
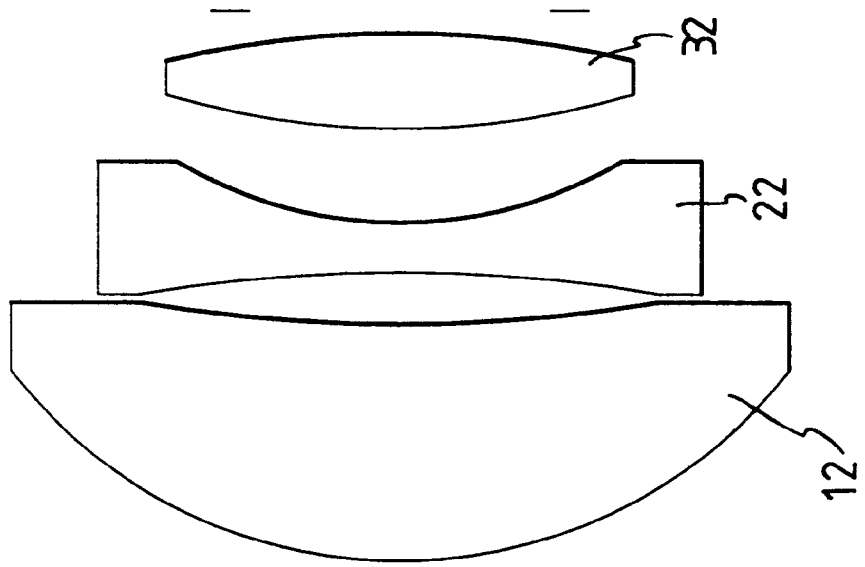
FIG. 9 is a front plan view of a lens system in accordance with a third embodiment of the present invention.

Referring to FIG. 6, it shows the spherical aberration curve of the first embodiment. Referring to FIG. 7, it shows th e astigmatism curve of the first embodiment. Referring to FIG. 8, it shows the distortion curve of the first embodiment.

Referring to FIGS. 9–12, in accordance with a third embodiment of the present invention, the optical lens system 102 comprises three juxtaposed plastic lenses 12, 22 and 32. The first lens 12 is a positive meniscus lens. The second lens 22 is a bi-concave meniscus lens. The third lens 32 is a positive lens. This lens system includes a diffractive surface. The equation for aspheric surface is expressed as equation [6], and the equation of phase difference of diffractive surface is expressed as equation [7].

Table 3 shows the demonstrated example of the third Embodiment.

TABLE 3

The first demonstrated example of Embodiment III.

| Surface | Radius | Thickness | Index | V number | Notes |
|---|---|---|---|---|---|
| OBJ | Plano | 2963.85 | | | |
| S1 | 7.3902 | 3.450 | 1.492 | 57.4 | |
| S2 | 23.2662 | 0.769 | | | |
| S3 | −20.2089 | 0.700 | 1.492 | 57.4 | Diffractive/Aspheric |
| S4 | 6.6084 | 1.380 | | | |
| S5 | 13.0307 | 1.380 | 1.492 | 57.4 | |
| S6 | −16.5707 | 0.17 | | | |
| STO | Plano | 28.294 | | | |
| IMG | | 0.006 | | | |

Notes
1. System focal length, fs = 34.02 mm, NA = 0.089, HFOV = 30.6 degree
G2 focal length, f2 = −10.48 mm
|f2/fs| = 0.308
2. Coefficients for the diffractive/aspheric surface S3:
C1 = −2.1784E-3, C2 = 1.3305E-4, C3 = −4.8233E-6
K = −7.561, A4 = 1.5854E-4, A6 = −5.0573E-6, A8 = −6.1205E-8

Referring to FIG. 10, it shows the spherical aberration curve of the first embodiment. Referring to FIG. 11, it shows the astigmatism curve of the first embodiment. Referring to FIG. 12, it shows the distortion curve of the first embodiment.

It should be clear to those skilled in the art that further embodiments may be made without departing from the scope of the present invention.

What is claimed is:

1. A lens system comprising three lenses juxtaposed with each other and each having refractive power, wherein, a first one of said three lenses is a plastic lens having a front side formed with a convex surface serving as positive power; a second one of said three lenses is a plastic lens having a front side formed with a concave surface serving as negative power and having a rear side formed with a convex surface; a third one of said three lenses is a glass lens serving as positive power; at least one aspherical surface is mounted on one of said plastic lenses, and the focal length of said lens system is ranged from 5 to 100 mm.

2. The lens system in accordance with claim 1, further comprising at least two flat lenses located between an image side and an object side without affecting the focal length of said lens system.

3. The lens system in accordance with claim 1, wherein said lens system has a focal length equal to $f_s$, said first lens has a focal length equal to $f_1$, said second lens has a focal length equal to $f_2$, and wherein, $0.2 < |f_2/f_s| < 0.6$, and $0.2 < |f_2/f_1| < 0.7$.

4. The lens system in accordance with claim 1, further comprising at least one diffractive surface mounted on one of said plastic lenses.

5. The lens system in accordance with claim 1, further comprising a diffractive surface mounted on said first lens.

6. A lens system comprising three lenses juxtaposed with each other and each having refractive power, wherein, a first one of said three lenses is a glass lens serving as positive power; a second one of said three lenses is a plastic lens having a front side formed with a convex surface and a rear side formed with a concave surface serving as negative power; a third one of said three lenses is a plastic lens having a rear side formed with a convex surface serving a positive power; at least one aspherical surface mounted on one of said plastic lenses, and the focal length of said lens system is ranged from 5 to 100 mm.

7. The lens system in accordance with claim 6, further comprising at least two flat lenses located between an image side and an object side without affecting the focal length of said lens system.

8. The lens system in accordance with claim 6, wherein said lens system has a focal length equal to $f_s$, said second lens has a focal length equal to $f_2$, said third lens has a focal length equal to $f_3$, and wherein, $0.2 < |f_2/f_s| < 0.6$, and $0.4 < |f_2/f_3| < 0.8$.

9. The lens system in accordance with claim 6, further comprising at least one diffractive surface mounted on one of said plastic lenses.

10. The lens system in accordance with claim 6, further comprising a diffractive surface mounted on said third lens.

11. A lens system comprising three lenses juxtaposed with each other and each having refractive power, wherein, a first one of said three lenses is a glass lens serving as positive power; a second one of said three lenses is a plastic lens having a rear side formed with a concave surface serving as negative power; a third one of said three lenses is a plastic lens having a rear side formed with a convex surface serving a positive power and a diffractive surface mounted on said third one of said three lenses; at least one aspherical surface mounted on one of said plastic lenses, and the focal length of said lens system is ranged from 5 to 100 mm.

12. The lens system in accordance with claim 11, further comprising at least two flat lenses located between an image side and an object side without affecting the focal length of said lens system.

13. The lens system in accordance with claim 11, wherein said lens system has a focal length of $f_s$, said second lens has a focal length equal to $f_2$, said third lens has a focal length equal to $f_3$, and wherein $0.2<|f_2/f_s|<0.6$, and $0.4<|f_2/f_3|<0.8$.

14. The lens system in accordance with claim 11, wherein said second lens has a front side formed with a convex surface.

15. The lens system in accordance with claim 11, further comprising at least one diffractive surface mounted on one of said plastic lenses.

* * * * *